H. J. WATTS.
COMPENSATING SHAFT COUPLING.
APPLICATION FILED AUG. 2, 1917.
1,317,247.
Patented Sept. 30, 1919.
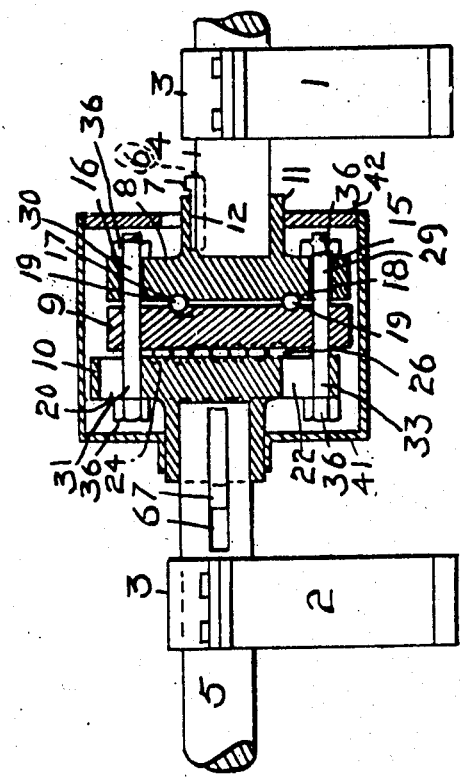
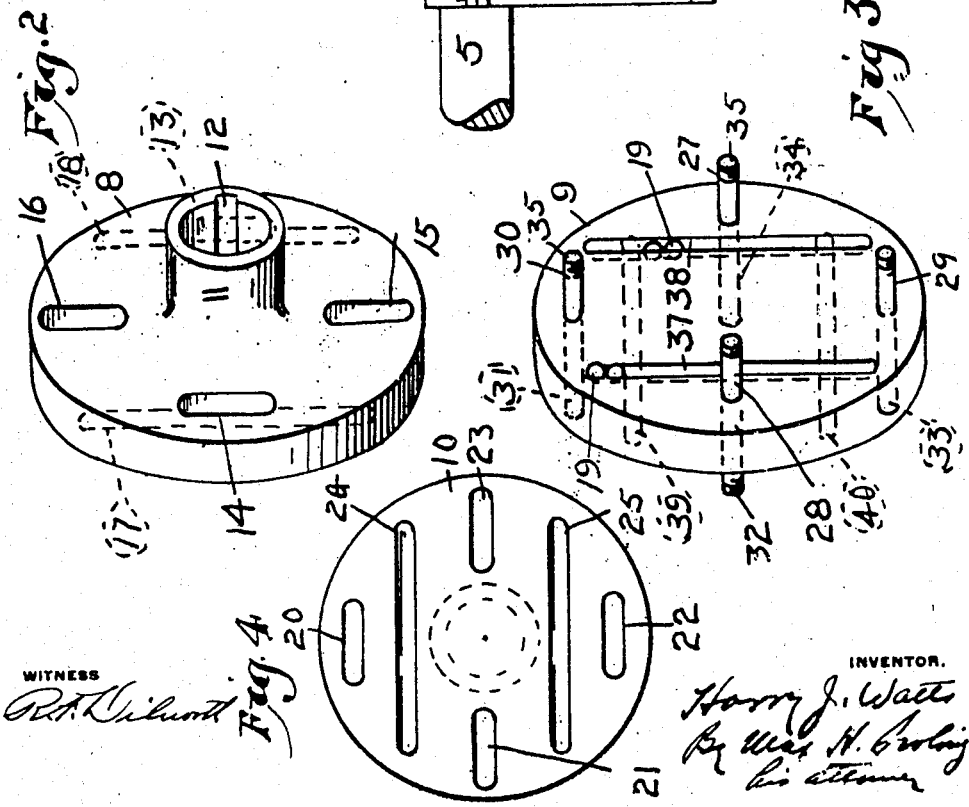
WITNESS
INVENTOR.
Harry J. Watts

UNITED STATES PATENT OFFICE.

HARRY JAMES WATTS, OF TURTLE CREEK, PENNSYLVANIA.

COMPENSATING SHAFT-COUPLING.

1,317,247.  Specification of Letters Patent.  Patented Sept. 30, 1919.

Application filed August 2, 1917. Serial No. 184,029.

*To all whom it may concern:*

Be it known that I, HARRY JAMES WATTS, a citizen of England, residing at Turtle Creek, in the county of Allegheny and State of Pennsylvania, have invented certain new and useful Improvements in Compensating Shaft-Couplings, of which the following is a specification.

This invention relates to shaft couplings of the compensating type and designed primarily for use for connecting a pair of shafts together whereby the axes thereof will be positioned in parallel planes, although it is to be understood that the coupling can be employed for any purposes wherein it is found applicable, and the invention has for its object to provide, in a manner as hereinafter set forth, a coupling of such type including means for coupling two elements together whereby the axes of said elements will extend in parallel planes and whether the both elements of the pair are to revolve or are stationary.

Further objects of the invention are to provide a compensating coupling which is simple in its construction and arrangement, capable of efficiently operating a driven element and a driving element when the former is off-set or eccentrically disposed with respect to the latter, strong, durable, having means to reduce friction to a minimum when in operative position, readily set up in operative position, and comparatively inexpensive.

With the foregoing and other objects in view the invention consists of a novel construction, combination and arrangement of parts as hereinafter more specifically described and illustrated in the accompanying drawings wherein is shown an embodiment of the invention, but it is to be understood that changes, variations and modifications can be resorted to which come within the scope of the claims hereunto appended.

In the drawings wherein like reference characters denote corresponding parts throughout the several views:

Figure 1 is a longitudinal sectional view of a compensating shaft coupling in accordance with this invention showing the adaptation thereof in connection with a pair of shafts having their axes arranged in parallelism.

Fig. 2 is a perspective view of the driving element of the coupling.

Fig. 3 is a perspective view of the transmission element of the coupling.

Fig. 4 is an elevation of the driven element of the coupling.

Referring to the drawings in detail 1 and 2 denote a pair of pillow blocks, each having its upper end provided with a shaft bearing 3.

Reference character 4 denotes a driving shaft which is mounted in the bearing 3 carried by the pillow block 1 and 5 denotes a driven shaft journaled in the bearing 3, carried by the pillow block 2.

Shaft 5 is off-set or eccentrically disposed with respect to the shaft 4 but is positioned whereby its axis is parallel with respect to the axis of the shafts 4, or in other words, the axes of the shaft 4, 5, are disposed in longitudinal planes but in parallelism.

The shaft 4, as well as the shaft 5, has a longitudinal key-way 6, having a key 7, for a purpose to be presently referred to.

Although the shaft 5 has been termed the driven shaft, yet it is to be understood that the shaft 5 could be the driving shaft and the shaft 4 the driven shaft, the arrangement of shafts as stated is merely set up by way of example.

The coupling consists of a driving element, a transmission element and a driven element, as illustrated, the driving element is indicated at 8, the transmission element at 9 and the driven element at 10. It will be stated however, that the element 10 could be the driving element and the shaft 5 the driving shaft, and the element 8 the driven element and the shaft 4 the driven shaft.

Driving element 8 consists of a circular disk of any suitable thickness having its outer face provided with an integral collar or sleeve 11, which is disposed centrally of the outer face of the disk and has its inner face provided with a longitudinal groove 12 adapted to aline with the groove or key-way 6, in the shaft 4, to receive the key 7, whereby the element 8 is fixedly secured to the shaft 4 so that when the latter revolves the element 8 will be carried therewith.

The disk forming part of the element 8 is provided with four elongated slots 13, 14, 15, 16. The slots 13, 14, are arranged parallel to each other, and also in planes parallel to the plane of the slots 15, 16, The slots 15, 16 extend to the same plane, and each of said slots is interposed between the axis of the element 8 and the edge of said disk. The slots 15, 16 have their outer walls terminate at a point in close proximity to the edge of the disk of the element 8.

The transverse center of each of the slots 13, 14 is in alinement with the axis of the disk of the element 8, and the said slots 13, 14 are arranged in proximity to the edge of the disk of the element 8.

The inner face of the disk of the element 8 is provided with a pair of elongated parallel grooves 17, 18, which provide ball races for bearing balls 19.

The driven element 10 is constructed in a manner similar to the driven element 8, with this exception, that the slots 20, 21, 22, 23, are disposed in planes at right angles to the planes of the slots 13 to 16 inclusive, and that the grooves 24, 25, on the inner face of the element 10, which form ball races for bearing balls 26, are disposed in planes at right angles with respect to the planes of the grooves 17, 18.

The transmission element 9 consists of a circular disk of the desired thickness and which has projecting from one face a series of equally spaced studs 27, 28, 29, 30, and which has projecting from its other face a series of equally spaced studs 31, 32, 33, 34.

The studs 27 to 30 inclusive extend respectively through the slots 13 to 16 inclusive, and the studs 31, 32, 33, 34 inclusive extend respectively through the slots 20 to 23.

Each of the studs have threaded outer ends as at 35 for the reception of a nut 36. The nuts 36 are arranged exteriorly of the elements 8 and 10, and provide means whereby the said elements 8 and 10 are connected to the element 9. One face of the disk of the element 9 is provided with a pair of grooves 37, 38, which oppose respectively the grooves 17, 18. The said grooves 37, 38 provide ball races and receive the bearing balls 19.

The other face of the disk of the element 9 is provided with a pair of grooves 39, 40, and which oppose respectively the grooves 24, 25 of the element 10. The grooves 39, 40 provide ball races and receive the bearing balls 26.

The ends of each groove of each of the disks are positioned inwardly with respect to the edge of their respective disk, under such conditions providing stops to arrest outward movement of the bearing balls mounted in said grooves.

The transmission element 9, when the coupling is set up, alternately shifts parallel to the elements 8 and 10, and during one revolution thereof, during periods of 90 degrees, will alternately be disposed concentrically or eccentrically with respect to the elements 8 and 10. When concentrically disposed to the driving element it is taking power therefrom and when concentrically disposed to the driven element it is transforming power to said element.

The element 9 is driven from the element 10 through the medium of the bearing balls 19 and studs 27 to 30 and the element 10 is driven from the element 9 through the medium of the bearing balls 26 and studs 31 to 34.

The bearing balls 19, 26, not only act to prevent thrust, as well as a driving means, but also reduce friction to a minimum during movement of the element 9 parallel to the inner face of the elements 8 and 10.

A suitable case to inclose the coupler for keeping out foreign substances and also to act as a lubricant container is employed, and said case consists of a body portion 41 having one end closed through the medium of a removable disk 42, the latter has threaded engagement with the body portion 41.

The case incloses the coupler and one end thereof is fixed to the sleeve 11 of the driven member. The sleeve 11 of the driving member revolves within the disk 42.

The compensating coupling device as described and illustrated provides a convenient means of operating a pair of shafts when disposed eccentrically with respect to each other and also provides means for coupling elements eccentrically disposed relative to each other.

What I claim is:

1. A coupling for the purpose set forth comprising a pair of outer disks, each of said disks provided with slots, the slots in one disk being disposed at an angle with respect to the slots in the other disk, an intermediate disk interposed between said outer disks and capable of shifting parallel to the inner faces of said outer disks, and means carried by the intermediate disk and extending through the slots of the outer disks for slidably connecting the intermediate and outer disks together.

2. A coupling for the purpose set forth comprising a pair of outer disks, each of said disks provided with slots, the slots in one disk being disposed at an angle with respect to the slots in the other disk, an intermediate disk interposed between said outer disks and capable of shifting parallel to the inner faces of said outer disks, and means carried by the intermediate disk and extending through the slots of the outer disks for slidably connecting the intermediate and outer disks together, anti-friction bearings interposed between said intermediate disks and said outer disks, the bearings between the intermediate disk and one outer disk traveling at an angle with respect to the direction of travel of the bearings between the inner disk and the other outer disk.

3. A coupling for the purpose set forth comprising a slotted driving element, a slotted driven element, slots in the latter element disposed at an angle with respect to the slots in the first mentioned element, a transmission element arranged between said driving element and said driven element and shiftable parallel in opposite directions with respect to the inner face of the driven and driving elements, and means extending through the transmission element, through the slots of the driving and driven elements and slidably connecting the transmission element to the driving and driven elements.

4. A coupling for the purpose set forth comprising a driving element, a driven element, a transmission element arranged between said driving element and said driven element and shiftable parallel to the inner faces of said driving and driven elements, and means carried by the transmission element and extending through and slidable in the driving and driven elements for slidably connecting the transmission element to the driving and driven elements, whereby the driven element is operated from the driving element through said means and transmission element.

5. A coupling for the purpose set forth comprising a driving element, a driven element, a transmission element arranged between said driving element and said driven element and shiftable parallel to the inner face of said driving and driven elements, means carried by the transmission element and extending through the driving and driven elements for slidably connecting the transmission element to the driving and driven elements, anti-friction means interposed between said transmission element and said driving element, and anti-friction means interposed between said transmission element and said driven element.

6. A coupling for the purpose set forth comprising a slotted driving element, a slotted driven element, the slots in the driven element disposed at an angle with respect to the slots in the driving element, a transmission element arranged between said driving element and driven element and shiftable parallel to the inner faces of the driving and driven elements, and studs carried by the transmission elements and projecting through each face thereof and extending through the slots of the driving and driven elements for slidably connecting therewith the transmission element.

In testimony whereof I affix my signature in the presence of two witnesses.

HARRY JAMES WATTS.

Witnesses:
 CHAS. J. WATTS,
 MAX H. SROLOVITZ.